(12) United States Patent
Cantero Clares et al.

(10) Patent No.: US 12,125,270 B2
(45) Date of Patent: Oct. 22, 2024

(54) SIDE BY SIDE IMAGE DETECTION METHOD AND ELECTRONIC APPARATUS USING THE SAME

(71) Applicant: Acer Incorporated, New Taipei (TW)

(72) Inventors: Sergio Cantero Clares, New Taipei (TW); Chih-Haw Tan, New Taipei (TW); Shih-Hao Lin, New Taipei (TW); Chih-Wen Huang, New Taipei (TW); Wen-Cheng Hsu, New Taipei (TW); Chao-Kuang Yang, New Taipei (TW)

(73) Assignee: Acer Incorporated, New Taipei (TW)

( * ) Notice: Subject to any disclaimer, the term of this patent is extended or adjusted under 35 U.S.C. 154(b) by 345 days.

(21) Appl. No.: 17/581,806

(22) Filed: Jan. 21, 2022

(65) Prior Publication Data

US 2022/0284701 A1 Sep. 8, 2022

(30) Foreign Application Priority Data

Mar. 3, 2021 (TW) ................................ 110107471

(51) Int. Cl.
*G06T 7/593* (2017.01)
*G06T 7/10* (2017.01)
*G06T 7/70* (2017.01)
*G06V 10/764* (2022.01)
*G06V 10/82* (2022.01)

(52) U.S. Cl.
CPC ................ *G06V 10/82* (2022.01); *G06T 7/10* (2017.01); *G06T 7/70* (2017.01); *G06V 10/764* (2022.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 2012/0038744 A1* | 2/2012 | Naka | H04N 13/359 |
| | | | 348/E13.001 |
| 2012/0320047 A1* | 12/2012 | Yanagita | G06F 3/0418 |
| | | | 345/419 |
| 2013/0169753 A1* | 7/2013 | Lee | H04N 13/178 |
| | | | 348/43 |
| 2014/0205190 A1* | 7/2014 | Chiang | H04N 13/00 |
| | | | 382/166 |
| 2019/0028691 A1* | 1/2019 | Hinds | H04N 21/4518 |
| 2019/0213481 A1 | 7/2019 | Godard et al. | |
| 2021/0093301 A1* | 4/2021 | Wang | A61B 8/463 |
| 2022/0124300 A1* | 4/2022 | Lin | H04N 13/302 |
| 2023/0386167 A1* | 11/2023 | Fuelster | G06V 10/776 |

FOREIGN PATENT DOCUMENTS

| | | |
|---|---|---|
| CN | 110348270 | 10/2019 |
| CN | 112017189 | 12/2020 |
| TW | I498854 | 9/2015 |
| TW | I739151 | 9/2021 |

* cited by examiner

*Primary Examiner* — Randolph I Chu
(74) *Attorney, Agent, or Firm* — JCIPRNET (57) ABSTRACT

A side by side image detection method and an electronic apparatus using the same are provided. The side by side image detection method includes the following steps. A first image with a first image size is obtained. A second image with a second image size that conforms to a side-by-side image format is detected within the first image by using a convolutional neural network model.

18 Claims, 6 Drawing Sheets

SIDE BY SIDE IMAGE DETECTION METHOD AND ELECTRONIC APPARATUS USING THE SAME

CROSS-REFERENCE TO RELATED APPLICATION

This application claims the priority benefit of Taiwan application serial no. 110107471, filed on Mar. 3, 2021. The entirety of the above-mentioned patent application is hereby incorporated by reference herein and made a part of this specification.

BACKGROUND

Technical Field

The disclosure relates to an electronic apparatus, and in particular to a side by side image detection method and an electronic apparatus using the same.

Description of Related Art

With the advancement of display technology, displays that support three-dimensional (3D) image playback have gradually become prevalent. The difference between 3D display and two-dimension (2D) display is that 3D display technology allows viewers to feel three-dimensional effects in an image, for example, 3D facial features and depth of field. A traditional 2D image cannot present the above effects. The principle of 3D display technology is to allow a viewer's left eye to view a left eye image and the viewer's right eye to view a right eye image, so that the viewer can feel the 3D visual effects. With the vigorous development of 3D stereoscopic display technology, 3D stereoscopic display technology provides people with a vivid visual experience. It is known that to play an image in a specific 3D image format, a 3D display needs to use a corresponding 3D display technology. Otherwise, the display cannot display the image correctly. Therefore, accurately recognizing an image content that conforms to a specific 3D image format is important to those skilled in the art.

SUMMARY

In view of the above, the disclosure proposes a side by side image detection method and an electronic apparatus using the same, which accurately detect an image content that conforms to a side-by-side image format.

An embodiment of the disclosure provides a side by side image detection method, which includes the following steps. A first image with a first image size is obtained. A second image that conforms to a side-by-side image format within the first image is detected by using a convolutional neural network model, and the second image has a second image size.

Another embodiment of the disclosure provides an electronic apparatus, which includes a storage device and a processor. The processor is connected to the storage device, and is configured to execute the following steps. A first image with a first image size is obtained. A second image that conforms to a side-by-side image format within the first image is detected by using a convolutional neural network model, and the second image has a second image size.

Based on the above, in the embodiments of the disclosure, whether an image includes an image content that conforms to the side-by-side image format is accurately detected by using the convolutional neural network model in the field of machine learning. The detection result may be applicable in a variety of application scenarios, thereby enhancing user experience and increasing an application range of 3D display technology.

To further describe the features and advantages of the disclosure, embodiments accompanied with drawings are described below in details.

DESCRIPTION OF THE EMBODIMENTS

Part of the embodiments of the disclosure will be described in detail in connection with the accompanying drawings. Same element symbols in the following description refer to same or like elements in different drawings. The embodiments are only part of the disclosure and do not disclose all the implementation methods of the disclosure. Specifically, the embodiments are examples of devices and methods described in the claims of the disclosure.

Figure 1:
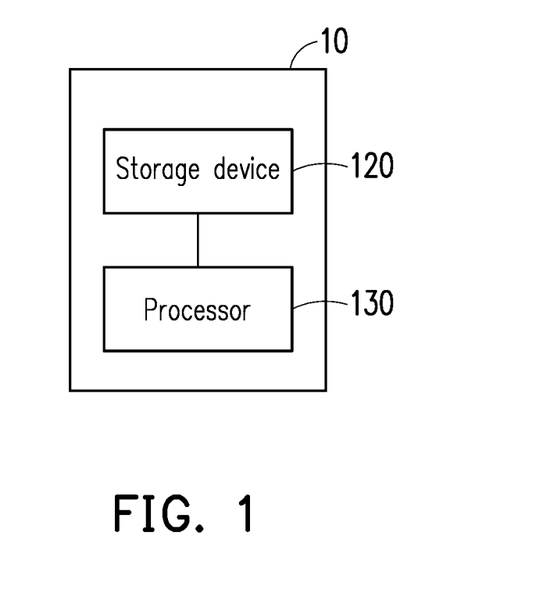
FIG. 1 is a schematic diagram of an electronic apparatus according to an embodiment of the disclosure.

FIG. 1 is a schematic diagram of an electronic apparatus according to an embodiment of the disclosure. Referring to FIG. 1, an electronic apparatus 10 may include a storage device 120 and a processor 130. The processor 130 is coupled to the storage device 120. In an embodiment, the electronic apparatus 10 may form a three-dimensional (3D) display system with a 3D display (not shown). The 3D display is, for example, an autostereoscopic 3D display or a glasses-type 3D display. On the other hand, the 3D display may be a head-mounted display device, or a computer screen, a desktop screen, or a TV providing a 3D image display function. A 3D display system may be a single integrated system or a separate system. Specifically, the 3D display, the storage device 120, and the processor 130 in the 3D display system may be implemented as an all-in-one (AIO) electronic apparatus, for example, a head-mounted display device, a notebook computer, or a tablet computer. Alternatively, the 3D display may be connected to the processor 130 of a computer system through a wired transmission interface or a wireless transmission interface.

The storage device 120 is configured to store images, data, and data such as program codes (for example, an operating system, an application, a driver) for the processor 130 to access. The storage device 120 may be, for example, any type of fixed or removable random access memory (RAM), read-only memory (ROM), flash memory, hard disk, or a combination thereof.

The processor 130 is coupled to the storage device 120. The processor 130 may be, for example, a central processing unit (CPU), an application processor (AP), or other programmable general-purpose or special-purpose devices such as a microprocessor, a digital signal processor (DSP), an image signal processor (ISP), a graphics processing unit (GPU), or other similar devices, integrated circuits, and a combination thereof. The processor 130 may access and execute the program codes and software modules recorded in the storage device 120 to implement a side by side image detection method in the embodiment of the disclosure.

Figure 2:
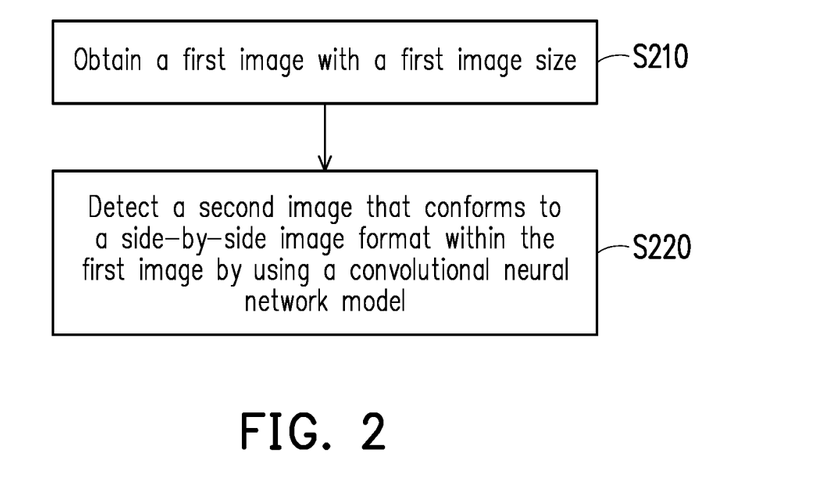
FIG. 2 is a flow chart of a side by side image detection method according to an embodiment of the disclosure.

FIG. 2 is a flow chart of a side by side image detection method according to an embodiment of the disclosure. Referring to FIG. 2, the method of the embodiment is applicable to the electronic apparatus 10 in the above embodiment. The following describes detailed steps of the embodiment in connection with various elements in the electronic apparatus 10.

In step S210, the processor 130 obtains a first image with a first image size. In an embodiment, the first image may be an image obtained by performing a screen capturing function on a picture displayed by a display. The first image may be, for example, an image content provided by an application operating in a full-screen mode, but the disclosure is not limited thereto. The first image may or may not include a user interface of the application. For example, the first image may be a photo played by a photo player in a full-screen mode. Alternatively, the first image may include a browser operation interface and an image content played by the browser. In addition, in an embodiment, the first image may be a single-frame image in an image stream.

In step S220, the processor 130 detects a second image that conforms to a side-by-side image format within the first image by using a convolutional neural network (CNN) model. The second image has a second image size. The side-by-side (SBS) image format is a 3D image format. The second image that conforms to the side-by-side image format includes an left eye image and an right eye image in a horizontal arrangement. A trained CNN model herein is a deep learning model constructed in advance through machine learning based on a training data set. The trained CNN model may be stored in the storage device 120. That is, model parameters (for example, the number of neural network layers and the weight of each of the neural network layer) of the trained CNN model have been determined by pre-training and stored in the storage device 120.

In some embodiments, the first image size is the same as the second image size. That is, the processor 130 may determine whether the first image is the second image that conforms to the side-by-side image format by using the trained CNN model. Alternatively, in some embodiments, the first image size is greater than the second image size. That is, the processor 130 may determine whether the first image includes the second image that conforms to the side-by-side image format and whether the second image is a partial image block within the first image by using the trained CNN model. From the above, the processor 130 may detect the second image that conforms to the side-by-side image format within the first image by using the CNN.

Based on the above, in some embodiments, in response to the processor 130 obtaining the second image that conforms to the side-by-side image format from the first image, the processor 130 may control the 3D display to automatically display the second image according to a corresponding picture playing mode to correctly display a 3D picture that a user wants to see. Alternatively, in response to the processor 130 obtaining the second image that conforms to the side-by-side image format from the first image, the processor 130 may first convert the second image that conforms to the side-by-side image format into a 3D format image that conforms to another 3D image format, and then control the 3D display to start a 3D display function to play the 3D format image that conforms to another 3D image format. Alternatively, in response to the processor 130 determining that the first image does not include the second image that conforms to the side-by-side image format, the processor 130 may generate a specific image that conforms to the side-by-side image format according to an image content of the first image, so that the 3D display may play the 3D picture according to a corresponding picture playing mode.

In addition, in some embodiments, the processor 130 may first determine a content attribute of the first image, and detect an image content that conforms to the side-by-side image format by using a CNN model corresponding to the content attribute. The above content attribute may include, for example, a cartoon animation attribute, a game picture attribute, and a real scene attribute. That is, the storage device 120 may record multiple CNN models corresponding to multiple content attributes, and the CNN models are respectively trained according to different training data sets. In some embodiments, the processor 130 may first determine the content attributes of the first image, and then select one of the CNN models to perform a subsequent detection action according to the content attributes of the first image. In this way, detection accuracy of the side by side image may be improved. That is, the processor 130 may train multiple CNN models based on an image content with different content attributes to further optimize the detection accuracy. The above is difficult to achieve with traditional image processing technology.

Figure 3:
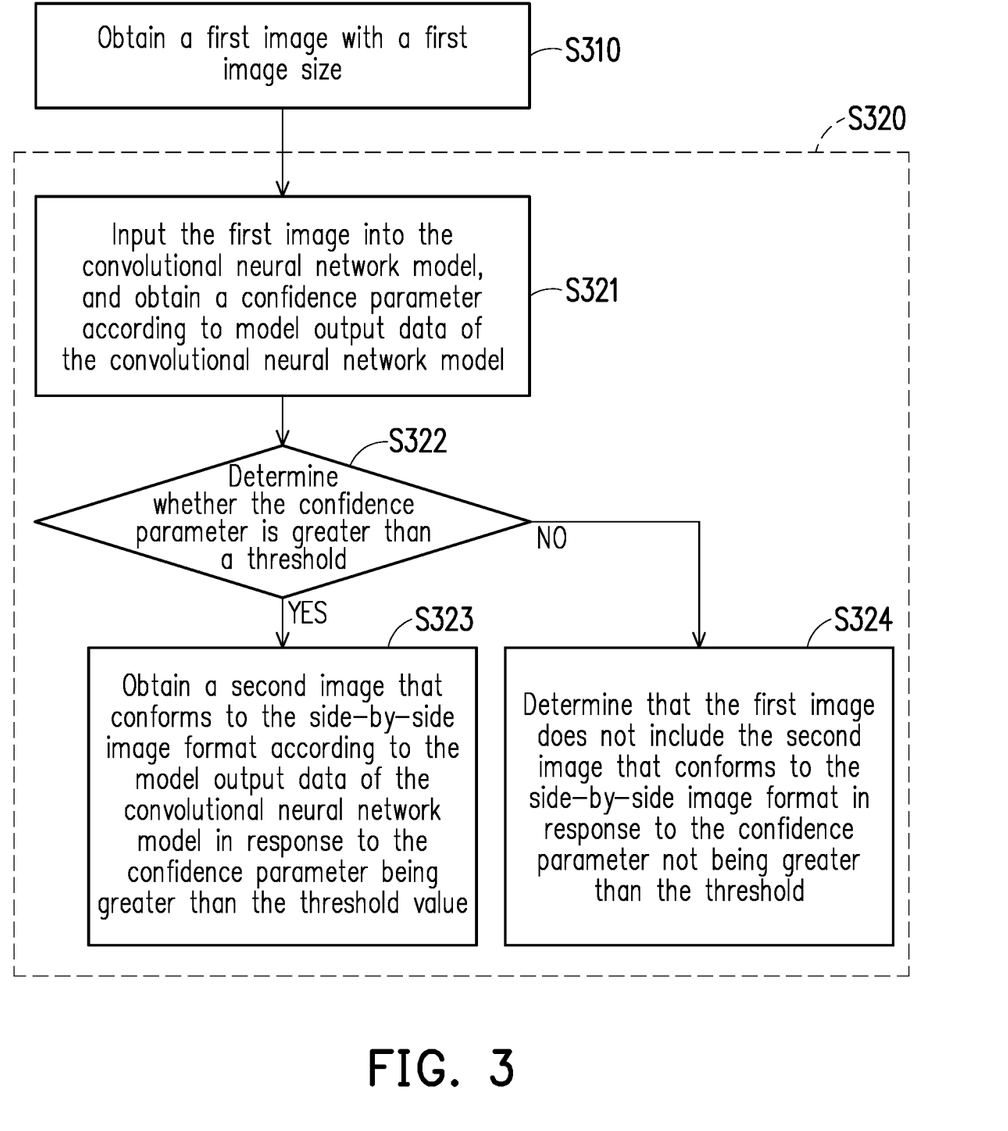
FIG. 3 is a flow chart of a side by side image detection method according to an embodiment of the disclosure.

FIG. 3 is a flow chart of a side by side image detection method according to an embodiment of the disclosure. Referring to FIG. 3, the method of the embodiment is applicable to the electronic apparatus 10 in the above embodiment. The following describes detailed steps of the embodiment in connection with various elements in the electronic apparatus 10.

In step S310, the processor 130 obtains a first image with a first image size. In step S320, the processor 130 detects a second image that conforms to a side-by-side image format within the first image by using a CNN model, and the second image has a second image size. In the embodiment, step S320 may be implemented as step S321 to step S324.

In step S321, the processor 130 inputs the first image into the CNN model, and obtains a confidence parameter according to model output data of the CNN model. The CNN model includes multiple convolutional layers that perform convolution operations, and the CNN model may be, for example, an object detection model or a semantic segmentation model. The processor 130 herein may use the CNN model to detect a rectangular image block that might conform to the side-by-side image format from the first image. According to model output data associated with the rectangular image block, the processor 130 may obtain a confidence parameter corresponding to the rectangular image block.

In some embodiments, when the CNN model is the object detection model, the rectangular image block is a detected object detected by the object detection model. Correspondingly, the confidence parameter may be an object classification probability of the detected object, or other parameters generated based on the object classification probability of the detected object. On the other hand, when the CNN model is the semantic segmentation model, the rectangular image block is determined by the semantic segmentation model to be an image block in which multiple pixels that belong to a side by side image category are distributed. Correspondingly, the confidence parameter may be a pixel density of the pixels determined to belong to the side by side image category in the rectangular image block.

In step S322, the processor 130 determines whether the confidence parameter is greater than a threshold value, and the threshold value may be set according to actual needs. Specifically, the CNN model may be configured to detect a rectangular image block that might conform to the side-by-side image format from the first image. When a confidence parameter corresponding to the rectangular image block is greater than the threshold value, the processor 130 may confirm that the rectangular image block is the second image that conforms to the side-by-side image format. Conversely, when the confidence parameter corresponding to the rectangular image block is not greater than the threshold value, the processor 130 may confirm that the rectangular image block is not the second image that conforms to the side-by-side image format.

If "Yes" is determined in step S322, in step S323, in response to the confidence parameter being greater than the threshold value, the processor 130 obtains the second image that conforms to the side-by-side image format according to the model output data of the CNN model. Specifically, after confirming that the rectangular image block detected by the CNN model is the second image that conforms to the side-by-side image format, the processor 130 may obtain a block position of the rectangular image block according to the model output data of the CNN model. Thus, the processor 130 may obtain an image position of the second image that conforms to the side-by-side image format within the first image according to the block position of the rectangular image block. Conversely, if "No" is determined in step S322, in step S324, in response to the confidence parameter not being greater than the threshold value, the processor 130 determines that the first image does not include the second image that conforms to the side-by-side image format. From the above, when the first image includes a partial image block and other image contents that conform to the side-by-side image format, the processor 130 may still accurately detect the partial image block that conforms to the side-by-side image format by using the CNN model. The above is difficult to achieve with traditional image processing technology.

In some embodiment, the CNN model includes an object detection model, for example, R-CNN, Fast R-CNN, Faster R-CNN, YOLO, or SSD for object detection, and the disclosure is not limited thereto. The model output data of the object detection model may include an object category, an object position, and the object classification probability (also known as a classification confidence) of the detected object. Based on the above, in some embodiments, the confidence parameter may include the object classification probability of the detected object detected by the CNN model. In addition, in some embodiments, the processor 130 may obtain the image position of the second image within the first image according to the position of the detected object detected by the CNN model.

Figure 4A:
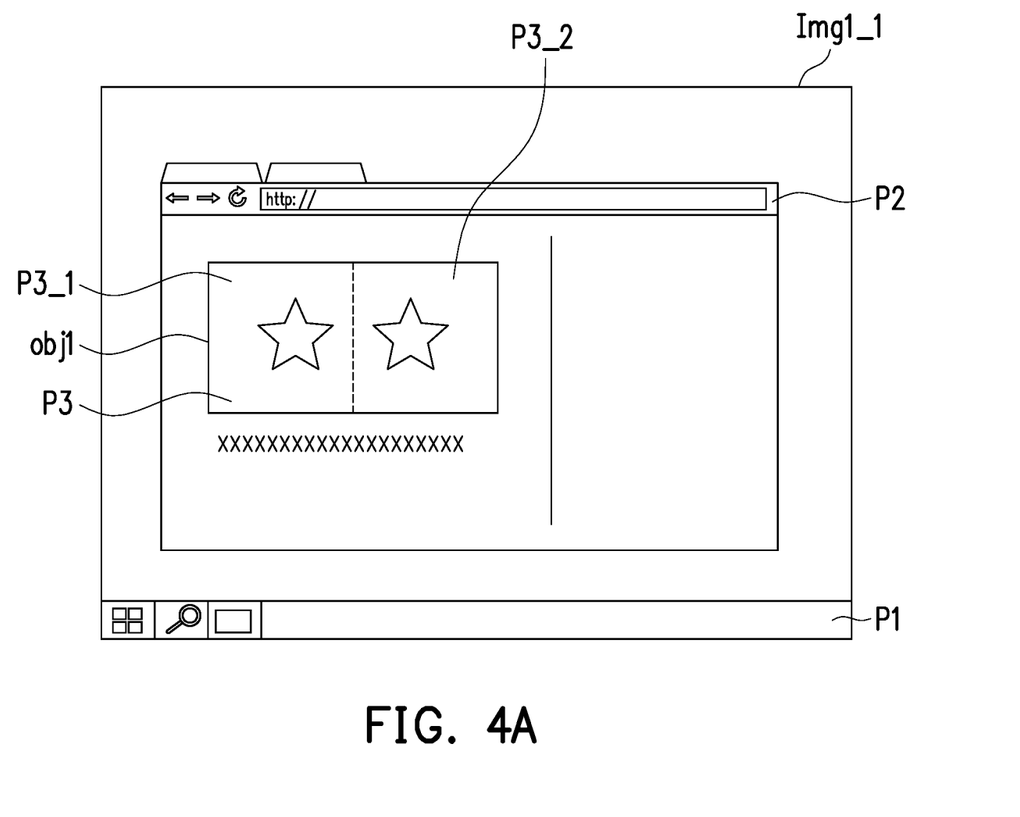
FIG. 4A is a schematic view of detecting a second image using an object detection model according to an embodiment of the disclosure.

FIG. 4A is a schematic view of detecting a second image using an object detection model according to an embodiment of the disclosure. Referring to FIG. 4A, the processor 130 may obtain a first image Img1_1 by using screen capturing technology. The first image Img1_1 includes an operating system desktop content P1, a browser operation interface P2, and a side by side image P3 played by the browser. In this example, the side by side image P3 conforms to the side-by-side image format and includes a left eye image P3_1 and a right eye image P3_2. The processor 130 may input the first image Img1_1 into a trained object detection model. In this way, the processor 130 may detect a detected object Obj1 that might conform to the side-by-side image format within the first image Img1_1 through the object detection model, and generate the object position and the object classification probability of the detected object Obj1. Next, the processor 130 may determine whether the object classification probability of the detected object Obj1 is greater than the threshold value. If the object classification probability of the detected object Obj1 is greater than the threshold value, the processor 130 may obtain the image position of the side by side image P3 (that is, the second image) within the first image Img1_1 according to the object position of the detected object Obj1. Based on the above, the processor 130 may detect the second image that conforms to the side-by-side image format, and capture the second image that conforms to the side-by-side image format from the first image Img1_1.

In some embodiments, the CNN model includes the semantic segmentation model. The model output data of the object detection model may include a classification result of each pixel in an input image. Based on the above, in some embodiments, the confidence parameter may include a pixel density of multiple pixels that are determined to belong to a first category by the CNN model. In addition, in some embodiments, the processor 130 may obtain the image position of the second image within the first image according to pixel positions of the pixels that are determined to belong to the first category by the CNN model.

Figure 4B:
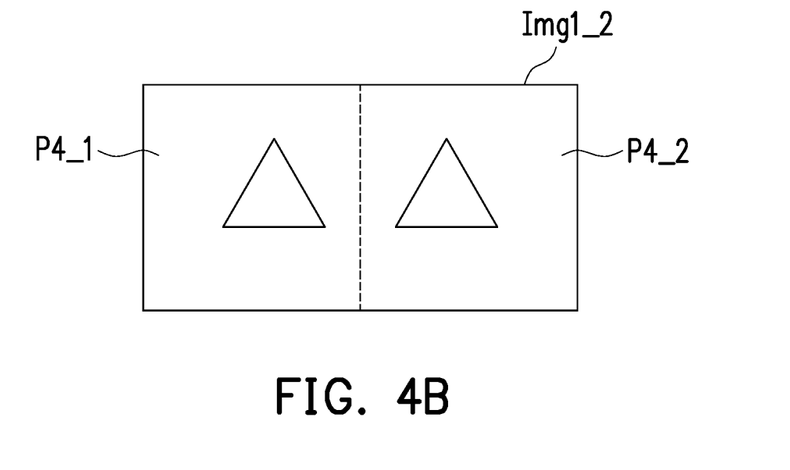
FIGS. 4B and 4C are schematic views of detecting a second image using a semantic segmentation model according to an embodiment of the disclosure.

FIG. 4B is a schematic view of detecting a second image using a semantic segmentation model according to an embodiment of the disclosure. Referring to FIG. 4B, the processor 130 may obtain a first image Img1_2 from an image stream. In this example, the first image Img1_2 conforms to the side-by-side image format and includes a left eye image P4_1 and a right eye image P4_2. The processor 130 may input the first image Img1_2 into a trained semantic segmentation model. The semantic segmentation model may classify each pixel in the first image Img1_2 to obtain a classification result of each of the pixels in the first image Img1_2. In an embodiment, each of the pixels in the first image Img1_2 may be classified into the first category and the second category by the semantic segmentation model. The first category includes pixels that belong to an image that conforms to the side-by-side image format, and the second category includes pixels that do not belong to the image that conforms to the side-by-side image format. The model output data of the semantic segmentation model are the classification result of each of the pixels in the first image Img1_2.

In the example of FIG. 4B, the processor 130 may subsequently calculate a pixel density of the pixels in the first image Img1_2 that are determined to belong to the first category to obtain the confidence parameter. Specifically, assuming that the first image Img1_2 includes N1 pixels, and that the number of pixels in the first image Img1_2 determined to belong to the first category by the CNN model is M1, the processor 130 may calculate a pixel density M1/N1 and obtain the confidence parameter. In response to the confidence parameter being greater than the threshold value, the processor 130 may determine that the first image Img1_2 is the second image that conforms to the side-by-side image format when. It is to be noted that, by comparing the threshold value and the confidence parameter, the processor 130 may avoid mistakenly determining the first image Img1_2 with a highly repetitive image content to conform to the side-by-side image format.

Figure 4C:
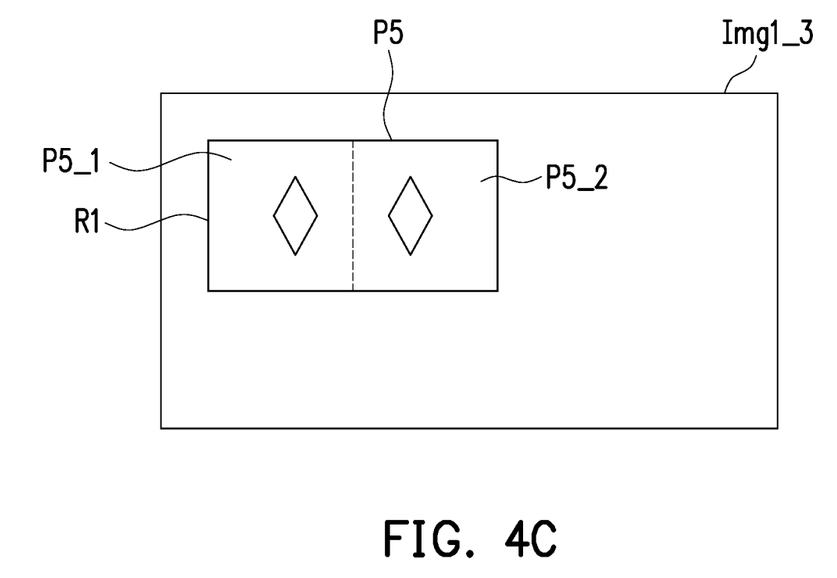

FIG. 4C is a schematic view of detecting a second image using a semantic segmentation model according to an embodiment of the disclosure. Referring to FIG. 4C, a first image Img1_3 includes a side by side image P5 and other image contents. In this example, the first image Img1_3 conforms to the side-by-side image format and includes a left eye image P5_1 and a right eye image P5_2. The processor 130 may input the first image Img1_3 into the trained semantic segmentation model. Similar to FIG. 4B, the model output data of the semantic segmentation model are a classification result of each pixel in the first image Img1_3.

Therefore, the processor 130 may obtain distribution positions of the pixels classified as the first category in the first image Img1_3. In this way, the processor 130 may capture a rectangular image block R1 from the first image Img1_3 according to the model output data of the semantic segmentation model. In some embodiments, the processor 130 may obtain a block position of the rectangular image block R1 according to the pixel positions of the pixels classified as the first category. In some embodiments, the block position of the rectangular image block R1 is determined according to the pixel positions of part of the pixels determined to belong to the first category by the semantic segmentation model. For example, the processor 130 may determine the rectangular image block R1 according to a maximum X coordinate, a minimum X coordinate, a maximum Y coordinate, and a minimum Y coordinate of the pixels classified as the first category in the first image Img1_3. Alternatively, in some embodiments, by searching inward from four boundaries of the first image Img1_3, the processor 130 may obtain the four boundaries of the rectangular image block R1 according to the pixel positions of the pixels determined to belong to the first category.

Next, the processor 130 may calculate a pixel density of the pixels in the rectangular image block R1 that are determined to belong to the first category by the semantic segmentation model to obtain the confidence parameter. Specifically, assuming that the rectangular image block R1 includes N2 pixels, and that the number of pixels in the rectangular image block R1 that are determined to belong to the first category by the semantic segmentation model is M2, the processor 130 may calculate a pixel density M2/N2 and obtain the confidence parameter. In the example of FIG. 4C, in response to the confidence parameter being greater than the threshold value, the processor 130 may determine that the rectangular image block R1 within the first image Img1_3 conforms to the side-by-side image format; that is, the rectangular image block R1 is the second image that conforms to the side-by-side image format and has the second image size. Therefore, the processor 130 may obtain an image position of the second image that conforms to the side-by-side image format within the first image Img1_3 according to the block position of the rectangular image block R1. As described above, the block position of the rectangular image block R1 is determined according to the pixel positions of the part of the pixels determined to belong to the first category by the semantic segmentation model. It is to be noted that, by comparing the threshold value and the confidence parameter, the processor 130 may avoid mistakenly determining the image block R1 with a highly repetitive image content to conform to the side-by-side image format.

Figure 5:
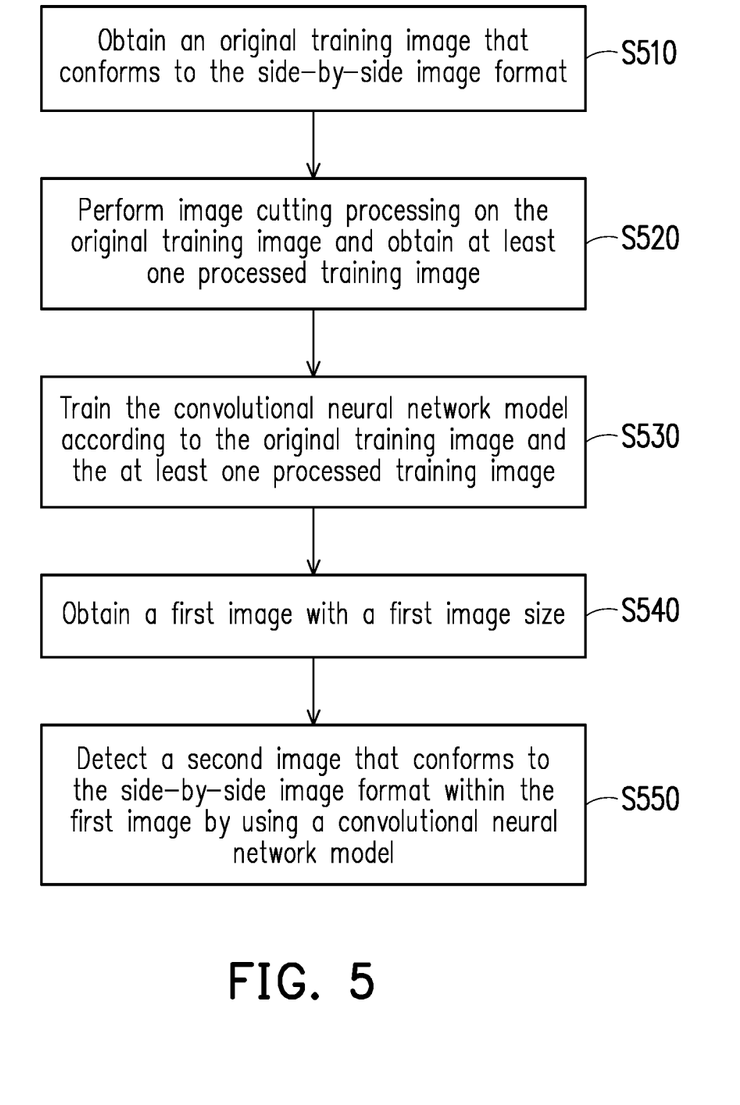
FIG. 5 is a flow chart of a side by side image detection method according to an embodiment of the disclosure.

FIG. 5 is a flow chart of a side by side image detection method according to an embodiment of the disclosure. Referring to FIG. 5, the method of the embodiment is applicable to the electronic apparatus 10 in the above embodiment. The following describes detailed steps of the embodiment in connection with various elements in the electronic apparatus 10.

In step S510, the processor 130 obtains an original training image that conforms to the side-by-side image format, that is, an original training image that includes the left eye image and the right eye image.

In step S520, the processor 130 performs image cutting processing on the original training image and obtains at least one processed training image. The processor 130 herein performs a data augmentation operation on the original training image and obtains multiple processed training images. The data augmentation operation is a method to increase the training data sets, and is mainly achieved by modifying the original training image.

Figure 6:
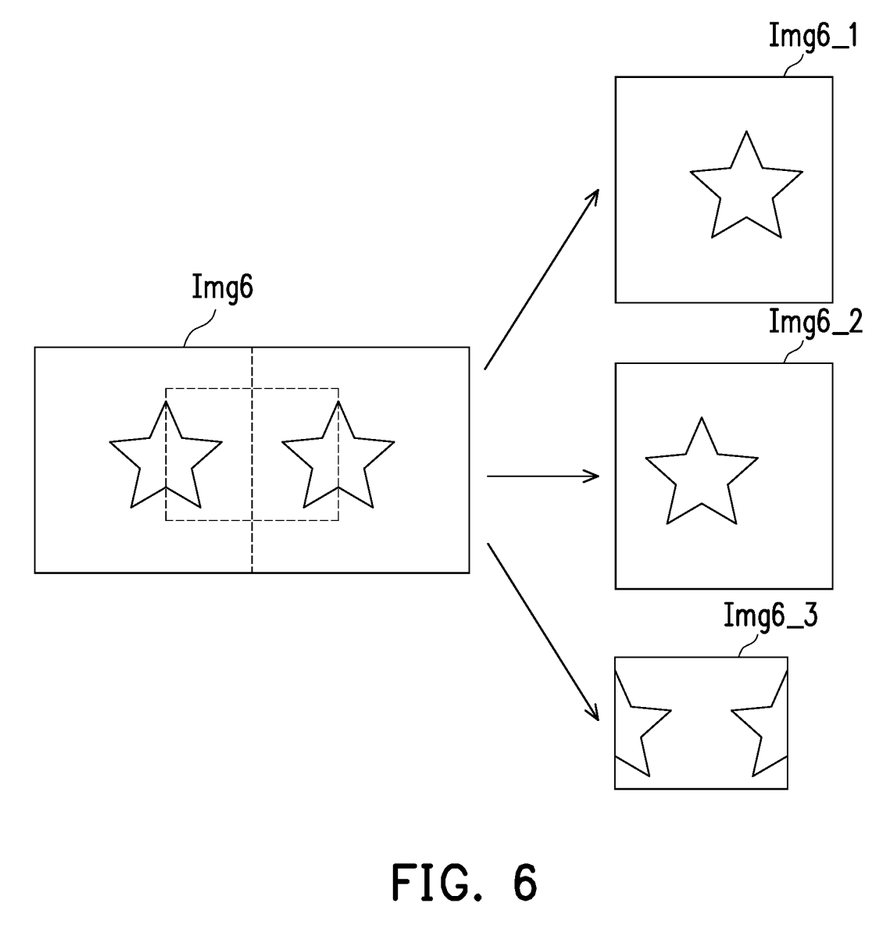
FIG. 6 is a schematic view of obtaining a processed training image according to an embodiment of the disclosure.

It is to be noted that, in order to cut out an image content that conforms to the side-by-side image format, in some embodiments, the processor 130 cuts out a central area of the side by side image and obtains another side by side image. FIG. 6 is a schematic view of obtaining a processed training image according to an embodiment of the disclosure. Referring to FIG. 6, after obtaining an original training image Img6 that conforms to the side-by-side image format, the processor 130 may obtain processed training images Img6_1, Img6_2, and Img6_3 through image cutting processing. The processed training image Img6_1 is the left eye image of the original training image Img6. The processed training image Img6_2 is the right eye image of the original training image Img6. The processed training image Img6_3 is a middle area image of the original training image Img6. From the above, both the original training image Img6 and the processed training image Img6_3 are side by side images that conform to the side-by-side image format, and the processed training images Img6_1 and Img6_2 are not side by side images that conform to the side-by-side image format.

After the processed training images are generated through the data augmentation operation, a solution object in the original training image and a solution object in the at least one processed training image are both selected and assigned to a solution category.

In step S530, the processor 130 trains the CNN model according to the original training image and the at least one processed training image. In a training phase of the CNN model, the processor 130 may calibrate multiple images with a correct solution according to a training data set. Specifically, the processor 130 may input the original training image and the at least one processed training image into the CNN model. By comparing an output of the CNN model and object information of the solution object, the processor 130 gradually updates weight information of the CNN model, and finally establishes a CNN model that may be configured to detect a side by side image that conforms to the side-by-side image format.

In step S540, the processor 130 obtains a first image with a first image size. In step S550, the processor 130 detects a second image that conforms to the side-by-side image format within the first image by using a CNN model, and the second image has a second image size.

In summary, in the disclosure, even if the first image includes other image contents, the second image that conforms to the side-by-side image format may be obtained from the first image through the CNN model. In addition, the CNN model may be trained according to the training data sets with similar image content attributes, so as to obtain higher detection accuracy based on specific image content attributes. The detection result may be applicable in a variety of application scenarios, thereby enhancing user experience and increasing an application range of 3D display technology. For example, after accurately obtaining the second image that conforms to the side-by-side image format, the 3D display may automatically switch to an appropriate image playing mode, thereby enhancing the user experience.

Although the disclosure has been disclosed in the above by way of embodiments, the embodiments are not intended to limit the disclosure. Those with ordinary knowledge in the technical field can make various changes and modifications without departing from the spirit and scope of the disclosure. Therefore, the scope of protection of the disclosure is defined by the scope of the appended claims.

What is claimed is:

1. A side by side image detection method, comprising:
   obtaining a first image with a first image size;
   detecting a second image that conforms to a side-by-side image format within the first image by using a convolutional neural network model, wherein the second image has a second image size; and
   switching a 3D display to a 3D display mode to display a 3D picture according to the second image in response to obtaining the second image that conforms to the side-by-side image format from the first image,
   wherein detecting the second image that conforms to the side-by-side image format within the first image by using the convolutional neural network model comprises:
   inputting the first image into the convolutional neural network model, and obtaining a confidence parameter according to model output data of the convolutional neural network model; and
   obtaining the second image that conforms to the side-by-side image format within the first image according to the model output data of the convolutional neural network model in response to the confidence parameter being greater than a threshold value.

2. The side by side image detection method according to claim 1, wherein the first image size is the same as the second image size.

3. The side by side image detection method according to claim 1, wherein the first image size is greater than the second image size.

4. The side by side image detection method according to claim 1, wherein detecting the second image that conforms to the side-by-side image format within the first image by using the convolutional neural network model further comprises:
   determining that the first image does not comprise the second image that conforms to the side-by-side image format in response to the confidence parameter not being greater than the threshold value.

5. The side by side image detection method according to claim 1, wherein the convolutional neural network model comprises an object detection model, and the confidence parameter comprises an object classification probability of a detected object detected by the convolutional neural network model.

6. The side by side image detection method according to claim 5, wherein obtaining the second image that conforms to the side-by-side image format according to the model output data of the convolutional neural network model comprises:
   obtaining an image position of the second image within the first image according to an object position of the detected object detected by the convolutional neural network model.

7. The side by side image detection method according to claim 1, wherein the convolutional neural network model comprises a semantic segmentation model, and obtaining the confidence parameter according to the model output data of the convolutional neural network model comprises:
   capturing a rectangular image block from the first image according to the model output data of the convolutional neural network model; and
   calculating a pixel density of a plurality of pixels in the rectangular image block that are determined to belong to a first category by the convolutional neural network model to obtain the confidence parameter.

8. The side by side image detection method according to claim 7, wherein obtaining the second image that conforms to the side-by-side image format according to the model output data of the convolutional neural network model comprises:
   obtaining an image position of the second image within the first image according to a block position of the rectangular image block, wherein the block position is determined according to a plurality of pixel positions of a part of the pixels determined to belong to the first category by the convolutional neural network model.

9. The side by side image detection method according to claim 1, wherein the method further comprises:
   obtaining an original training image that conforms to the side-by-side image format;
   performing image cutting processing on the original training image and obtaining at least one processed training image; and
   training the convolutional neural network model according to the original training image and the at least one processed training image.

10. An electronic apparatus, comprising:
    a storage device, wherein a plurality of modules are recorded; and
    a processor, connected to the storage device, configured to:
       obtain a first image with a first image size; and
       detect a second image that conforms to a side-by-side image format within the first image by using a convolutional neural network model, wherein the second image has a second image size,
    wherein the processor is configured to:
    switching a 3D display to a 3D display mode to display a 3D picture according to the second image in response to obtaining the second image that conforms to the side-by-side image format from the first image;
    input the first image into the convolutional neural network model, and obtain a confidence parameter according to model output data of the convolutional neural network model; and
    obtain the second image that conforms to the side-by-side image format within the first image according to the model output data of the convolutional neural network model in response to the confidence parameter being greater than a threshold value.

11. The electronic apparatus according to claim 10, wherein the first image size is the same as the second image size.

12. The electronic apparatus according to claim 10, wherein the first image size is greater than the second image size.

13. The electronic apparatus according to claim 10, wherein the processor is configured to: determine that the first image does not comprise the second image that conforms to the side-by-side image format in response to the confidence parameter not being greater than the threshold value.

14. The electronic apparatus according to claim 10, wherein the convolutional neural network model comprises an object detection model, and the confidence parameter comprises an object classification probability of a detected object detected by the convolutional neural network model.

15. The electronic apparatus according to claim 14, wherein the processor is configured to: obtain an image position of the second image within the first image according to an object position of the detected object detected by the convolutional neural network model.

16. The electronic apparatus according to claim 10, wherein the convolutional neural network model comprises a semantic segmentation model, and the processor is configured to:

capture a rectangular image block from the first image according to the model output data of the convolutional neural network model; and     calculate a pixel density of a plurality of pixels in the rectangular image block that are determined to belong to a first category by the convolutional neural network model to obtain the confidence parameter.

17. The electronic apparatus according to claim 16, wherein the processor is configured to: obtain an image position of the second image within the first image according to a block position of the rectangular image block, wherein the block position is determined according to a plurality of pixel positions of a part of the pixels determined to belong to the first category by the convolutional neural network model.

18. The electronic apparatus according to claim 10, wherein the processor is configured to:

obtain an original training image that conforms to the side-by-side image format;

perform image cutting processing on the original training image and obtain at least one processed training image; and     train the convolutional neural network model according to the original training image and the at least one processed training image.

\* \* \* \* \*